T. W. MORRIS.
TIRE VALVE.
APPLICATION FILED MAY 14, 1915.
1,232,592.
Patented July 10, 1917.
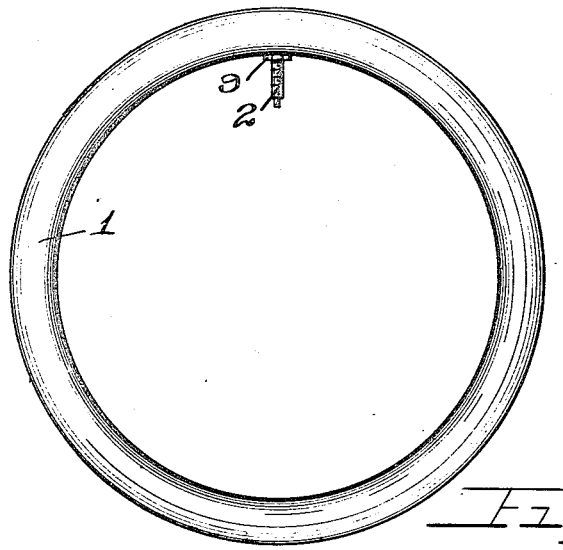
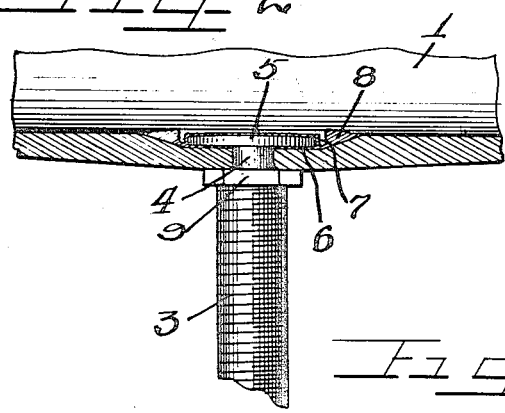
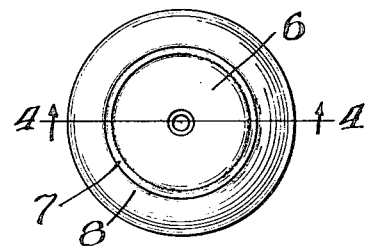
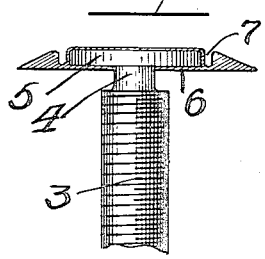
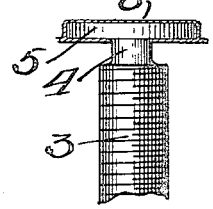
Witnesses
J. W. Angell
Charles Pills Jr.
Inventor
Thomas H. Morris
by Charlesworth Atty.

UNITED STATES PATENT OFFICE.

THOMAS W. MORRIS, OF CHICAGO, ILLINOIS, ASSIGNOR OF ONE-HALF TO GEORGE B. DRYDEN, OF CHICAGO, ILLINOIS.

TIRE-VALVE.

1,232,592.  Specification of Letters Patent.  Patented July 10, 1917.

Application filed May 14, 1915. Serial No. 27,971.

*To all whom it may concern:*

Be it known that I, THOMAS W. MORRIS, a citizen of the United States, and a resident of the city of Chicago, in the county of Cook and State of Illinois, have invented certain new and useful Improvements in a Tire-Valve; and I do hereby declare that the following is a full, clear, and exact description of the same, reference being had to the accompanying drawings, and to the numerals of reference marked thereon, which form a part of this specification.

It has heretofore been the practice in the construction of inner tubes for tires, to attach the tire valve by inserting the threaded valve stem through the tire tube permitting the upper roughened face of the metallic head which is integrally formed on the lower end of the valve stem, to contact with the inner surface of the tire tube. A nut is then threaded on the valve stem and presses the wall of the inner tube firmly against the face of the head, thus making a tight joint. This method, however, has not proven satisfactory, due to the constant jarring received by the valve, tending to loosen the nut, thereby causing leakage of the valve. A further difficulty frequently encountered in the construction above referred to, is the tearing away of the tubing from around the edge of the valve head, when the tire becomes deflated.

This invention therefore relates to an improved tire valve construction, in which the metallic head is embedded in a rubber casing having a groove adjacent the head and so formed that it can be vulcanized to the inner tube to reinforce the same and capable of being torn from its rubber casing at the grooved portion thereof when desired with no material damage to the tube, which may be readily equipped with a new valve and reused.

It is also an object of this invention to construct a tire valve having a head covered with a rubber casing forming an integral circular flange portion constructed to permit the same to be embedded in the inner tube to form an air tight connection by vulcanizing or cementing the flange to the tube, said casing having a groove therein adjacent the valve head permitting the head of said valve to be torn away from its rubber casing at the grooved portion thereof and removed from the tube without material injury to the tube.

It is finally an object of this invention to construct a tire valve comprising a grooved rubber head attached thereon, and a valve stem shaped to engage through the tube with the head thereof vulcanized to the tube, said valve adapted to be torn away at its grooved rubber head portion to permit removal and replacement of the valve.

The invention (in a preferred form) is illustrated in the drawings and hereinafter more fully described.

In the drawings:

Figure 1, is a side elevation of an inner tire tube, showing the valve stem attached thereto.

Fig. 2, is an enlarged fragmentary detailed section, showing the tire valve attached to the inner tube with parts in elevation.

Fig. 3, is a bottom plan view of the valve equipped with its rubber head or casing.

Fig. 4, is a section taken on line 4—4 of Fig. 3, showing parts in elevation.

Fig. 5, is a view similar to Fig. 4, showing the flange portion torn away.

As shown in the drawings:

The inner tube of an automobile tire is designated by reference numeral 1, and secured thereto is a tire valve of the usual type represented as a whole by reference numeral 2. Said valve 2, comprises a threaded valve stem 3, having a narrowed neck 4, integral therewith, and a head 5, integrally formed on the end of said neck. Said head 5, is embedded in a rubber casing 6, having a circular groove 7, therein adjacent the head 5 and an integral outwardly tapered flange portion 8, adapted to be cemented or vulcanized to the inner surface of the tube, which fits over and around the neck piece 4, where it is held in place by a nut 9, threaded on the stem 3.

The operation is as follows:

The tire valve is mounted in the usual manner and the flange 8, vulcanized or cemented to the inner surface of the tube, as shown in Fig. 2, thus reinforcing the same and producing an air tight connection. The tube 1, being fitted around the neck 4, where it may be further firmly held in place by the nut 9. When trouble occurs to the valve member which cannot be repaired, it may become necessary to remove the old valve and replace the same by a new one. The groove 7, formed in the rubber casing 6, adjacent the valve stem head 5, weakens the casing below the groove to permit the valve to be torn away at the weakened portion of the casing and removed from the tube without any material damage to the tube, leaving the valve as shown in Fig. 5, with the tapered flange portion 8, of the casing 6, remaining in the tube. The tube may then be equipped with a new valve.

Of course, it is obvious from the construction described that the nut 9, may be omitted from the construction if desired as it forms no part of my invention and is not a necessary adjunct to the construction described.

I am aware that various details of construction may be varied through a wide range without departing from the principles of this invention. I therefore do not purpose limiting the patent granted otherwise than necessitated by the prior art.

I claim as my invention:

1. In a device of the class described, a tire valve, and a casing attached thereon having a groove therein adjacent the valve head.

2. In a device of the class described, a tire valve, a casing for said valve, and an outwardly tapered flange integral therewith having a groove therein adjacent the tire valve head.

In testimony whereof I have hereunto subscribed my name in the presence of two subscribing witnesses.

THOMAS W. MORRIS.

Witnesses:
CHARLES W. HILLS, Jr.,
LEON M. REIBSTEIN.